(12) United States Patent
Boehm et al.

(10) Patent No.: US 10,645,946 B2
(45) Date of Patent: May 12, 2020

(54) METHOD OF PRODUCING A BLENDED FREEZE DRIED, SPRAY DRIED SOLUBLE COFFEE POWDER

(71) Applicant: NESTEC S.A., Vevey (CH)

(72) Inventors: Robert Thomas Boehm, Marysville, OH (US); Xiaoping Fu, Dublin, OH (US); Adam Gregory Yunker, Upper Arlington, OH (US)

(73) Assignee: Societe des Produits Nestle S.A., Vevey (CH)

( * ) Notice: Subject to any disclaimer, the term of this patent is extended or adjusted under 35 U.S.C. 154(b) by 211 days.

(21) Appl. No.: 15/107,214

(22) PCT Filed: Dec. 8, 2014

(86) PCT No.: PCT/EP2014/076929
§ 371 (c)(1),
(2) Date: Jun. 22, 2016

(87) PCT Pub. No.: WO2015/096972
PCT Pub. Date: Jul. 2, 2015

(65) Prior Publication Data
US 2017/0000152 A1    Jan. 5, 2017

Related U.S. Application Data

(60) Provisional application No. 61/920,146, filed on Dec. 23, 2013.

(51) Int. Cl.
A23F 5/38 (2006.01)
A23F 5/32 (2006.01)
A23F 5/34 (2006.01)

(52) U.S. Cl.
CPC ............... *A23F 5/38* (2013.01); *A23F 5/32* (2013.01); *A23F 5/34* (2013.01)

(58) Field of Classification Search
None
See application file for complete search history.

(56) References Cited

U.S. PATENT DOCUMENTS

| 3,565,635 | A | | 2/1971 | Mahlmann | |
| 3,660,108 | A | | 5/1972 | Mednis | |
| 5,972,409 | A | * | 10/1999 | Liu et al. | 426/595 |
| 6,497,911 | B1 | * | 12/2002 | Hansen et al. | |
| 2006/0024420 | A1 | * | 2/2006 | Kessler | |
| 2010/0247716 | A1 | * | 9/2010 | Castro | A23F 5/14 426/93 |

(Continued)

FOREIGN PATENT DOCUMENTS

| AU | 1972050169 B | * | 7/1974 |
| CA | 1151940 | | 8/1983 |

(Continued)

*Primary Examiner* — Tamra L. Dicus
(74) *Attorney, Agent, or Firm* — K&L Gates LLP

(57) ABSTRACT

The present invention relates to a method of producing a freeze dried soluble coffee powder which produces foam when dissolved in water. The method involves partly melting the surface of a granulated frozen coffee extract and mixing it with a porous spray dried coffee powder whereby the porous spray dried powder particles stick to the surface of the granulated frozen coffee extract particles, and freeze drying the particles.

10 Claims, 1 Drawing Sheet

(56) References Cited

U.S. PATENT DOCUMENTS

2010/0278995 A1* 11/2010 Boehm .................. A23C 11/00
426/590

FOREIGN PATENT DOCUMENTS

| CA | 2705101 A1 * | 5/2009 |
|----|--------------|--------|
| EP | 2100514 | 9/2009 |
| WO | 2009059938 | 5/2009 |
| WO | 2009080596 | 7/2009 |

* cited by examiner

METHOD OF PRODUCING A BLENDED FREEZE DRIED, SPRAY DRIED SOLUBLE COFFEE POWDER

CROSS REFERENCE TO RELATED APPLICATIONS

The present application is a National Stage of International Application No. PCT/EP2014/076929, filed on Dec. 8, 2014, which claims priority to U.S. Provisional Patent Application No. 61/920,146, filed Dec. 23, 2013, the entire contents of which are being incorporated herein by reference.

FIELD OF THE INVENTION

The present invention relates to a method of producing a soluble coffee powder which produces foam when dissolved in liquid.

BACKGROUND

Soluble coffee powder is a phrase used to describe coffee powder which has been prepared by extraction of roast and ground coffee followed typically by drying of the extract into a powdered product by conventional means such as freeze-drying, spray-drying or the like. In order to prepare a coffee beverage, hot water is then simply added to the powder thus avoiding the complicated and time-consuming process which is involved when preparing a beverage from traditional roast and ground coffee.

However, unlike coffee beverages prepared directly from roast and ground coffee, those prepared from instant soluble coffee do not usually exhibit a fine foam on their upper surface when reconstituted with hot water. The foamed upper surface in beverages prepared directly from roast and ground coffee are typically associated with and caused, at least in part, by the machines which brew with pressurised water and/or steam. This foam, also called "crema" is known to positively affect the mouthfeel of the product when consumed and so is highly desired by many consumers. Furthermore, the foam acts to keep more of the volatile aromas within the beverage so that they can be appreciated by the consumer rather than lost to the surrounding environment. If a similar foam is to be achieved in a coffee beverage prepared from soluble coffee powder, the foam must be generated by simple admixing of the soluble coffee powder and a liquid.

EP 2194795 and EP 0839457 discloses methods whereby gas is injected into a coffee extract which is subsequently spray dried to produce a spray dried soluble coffee powder producing foam when dissolved in a liquid. Freeze dried soluble coffee powders may have advantages over spray dried powders in terms of e.g. aroma and freeze dried powders are often perceived by consumers as being of superior quality, therefore there is a need to provide freeze dried powders which can produce foam upon dissolution. WO 2009/059938 and WO 2009/080596 disclose sintering methods for producing soluble coffee powders with a freeze dried or agglomerated texture and appearance which produces foam upon dissolution in a liquid. Sintering methods, however, are complex and cannot readily be implemented into existing facilities for producing freeze dried coffee. There is thus a need for simple methods to produce freeze dried coffee powders that produce a foam upon dissolution in a liquid.

SUMMARY OF THE INVENTION

The inventors have found that a freeze dried soluble coffee product producing foam upon dissolution can be obtained by covering particles of a frozen coffee extract with porous spray dried soluble coffee particles. Consequently, the present invention relates to a method of producing a soluble coffee powder, the method comprising: a) providing a porous spray dried soluble coffee powder; b) providing a granulated frozen coffee extract; c) heating the granulated frozen coffee extract to partly melt the powder surface; d) mixing the porous spray dried coffee powder with the heated granulated frozen coffee extract to produce particles of the frozen coffee extract covered by particles of the porous spray dried coffee powder; and e) freeze drying the covered particles of frozen coffee extract obtained in step d.

DETAILED DESCRIPTION OF THE INVENTION

Porous Spray Dried Soluble Coffee Powder

Figure 1:
FIG. 1 is a photograph of a soluble coffee powder of the invention.

According to the method of the present invention a porous spray dried soluble coffee powder is provided in step a). The porous pray dried soluble coffee powder may be provided by injecting gas into a liquid coffee extract and spray drying the gas injected liquid coffee extract. Suitable methods for producing porous spray dried soluble coffee powders are e.g. disclosed in EP 2194795 and EP 0839457. Methods for producing liquid coffee extracts are well known in the art of producing soluble coffee, e.g. from EP 0826308 and EP 0916267. Any suitable gas may be injected into the coffee extract, e.g. atmospheric air, nitrogen, and/or carbon dioxide. The gas is preferably injected under a pressure between about 50 and about 400 bar, preferably between about 150 and about 350 bar. The coffee extract preferably has a dry matter content of between about 35 and about 70% by weight. The gas injection is preferably performed at a temperature of about 10 to about 70° C., preferably about 30 to about 70° C. The gas injected coffee extract is then spray dried. Suitable methods of spray drying coffee extracts to produce a spray dried soluble coffee powder are well known in the art.

The spray dried soluble coffee powder particles preferably have a porosity of at least about 55%, more preferably at least about 65%, and even more preferably at least about 70%. The pores of the powder may have an average diameter $D_{50}$ of less than about 80 microns, preferably less than about 60 microns, more preferably less than about 40 microns, most preferably less than about 25 microns. The powder may also be characterised by the span of the void space distribution in the particle, which may e.g. be obtained from X-ray tomography. The distribution span factor (n) is calculated by the following equation:

$$n = \frac{D_{90} - D_{10}}{D_{50}}$$

Wherein $D_{90}$, $D_{10}$ and $D_{50}$ represents the diameters where 90%, 10% and 50%, respectively, of the particle volume is in particles with a size below this value. The powder preferably has a distribution span factor (n) of less than about 4, more preferably less than about 3, even more preferably less than about 2, most preferably less than about 1.5.

The particle size of the porous spray dried coffee powder is preferably between about 10 and about 300 microns, more preferably between about 10 and about 200 microns, even more preferably between about 10 and about 150 microns, most preferably less than about 100 microns.

Granulated Frozen Coffee Extract

According to the method of the invention a granulated frozen coffee extract is provided. A granulated frozen coffee extract may be provided by any suitable means; preferably it is provided by injecting gas into a liquid coffee extract, freezing the gas injected liquid coffee extract, and granulating the frozen gas injected coffee extract. During production of freeze dried soluble coffee powders it is normal practice to produce a liquid coffee extract, inject gas into the liquid extract, freezing the gas injected extract and granulating the frozen extract, and conventional methods employed in the production of freeze dried soluble coffee may be used.

The granulated frozen coffee extract preferably has a water content of between about 25 and about 75% by weight, more preferably between about 35 and about 65%, even more preferably between about 40 and about 55%. The particle size of the granulated frozen coffee extract is preferably between about 300 and about 3600 microns, more preferably between about 600 and about 2500 microns, even more preferably between about 1000 and about 2200 microns.

Heating the Granulated Frozen Coffee Extract

The granulated frozen coffee extract is heated to partly melt the powder surface. This step allows the porous spray dried soluble coffee powder to stick to and coat the surface of the granulated frozen coffee particles during the subsequent mixing step. The heating is performed such that the surface is partly melted but the internal structure of the particles is maintained. The heating may e.g. be performed by exposing the frozen granule to room temperature for less than about 1 min.

Mixing of Powders

The porous spray dried coffee powder is mixed with the heated granulated frozen coffee extract to produce particles of the frozen coffee extract covered by particles of the porous spray dried coffee powder. During the mixing the porous spray dried soluble coffee powder particles will stick to the surface of the granulated frozen extract particles. By particles of the frozen coffee extract covered by particles of the porous spray dried coffee powder is meant that porous spray dried soluble coffee powder particles are sticking to the surface of the granulated frozen extract particles, a total coverage of the surface is not necessarily implied, the degree of surface coverage may e.g. depend on the ratio between the amounts of the two types of particles. The weight ratio of porous spray dried powder and granulated frozen coffee extract is preferably between about 66:33 and about 20:80 during the mixing of step d). The mixing may be performed by any suitable methods, e.g. by using a paddle mixer for a preferred period of time.

The heating of the granulated frozen coffee extract in step c) may be performed before, during or after the mixing of the powders in step d). Thus, in some embodiments the powders may be mixed and the mix is heated to allow the granulated frozen coffee extract to be coated by the porous spray dried coffee powder. In a preferred embodiment step d is performed before step c).

Freeze Drying

After mixing, the particles of the frozen coffee extract covered by particles of the porous spray dried coffee powder are freeze dried to produce the soluble coffee powder of the invention. Methods for freeze drying soluble coffee are well known in the art and any suitable method may be used.

In a preferred embodiment of the invention the soluble coffee powder produces a foam volume of at least about 1 mL, more preferably at least about 2 mL, when 5 g of soluble coffee powder is dissolved in 200 mL water at 90° C.

EXAMPLES

Example 1

Porous Spray Dried Soluble Coffee Powder

Roast and ground coffee beans were extracted with water using standard soluble coffee processing technology and the extract was concentrated to a solid matter content of 55%. The concentrated extract was pressurised to 160 bar at 60° C. at 600 kg/h extract flow rate. 3 Nl/kg of Nitrogen was injected into the pressurized extract at 160 bar leading to solubilisation of the Nitrogen. The gas-injected extract was spray dried at 70° C. tower temperature to produce a porous spray dried coffee powder with a closed porosity between 40 and 60% and a producing a crema volume of 10 to 15 ml/5 g when dissolved in hot water.

Frozen Granulated Coffee Extract

Roast and ground coffee beans were extracted with water using standard soluble coffee processing technology and the extract was concentrated to a solid matter content of 55%. Carbon dioxide was injected into the concentrated extract to foam it and subsequently cooled. The foamed cooled extract was deposited on a freezing belt and frozen and the frozen extract was ground into granules.

Heating and Mixing

The porous spray dried soluble coffee powder was proportionally mixed at a ratio of 50:50 with the frozen granulated coffee extract in a sealed container. This container was exposed to a temperature of approximately 25° C. for less than one minute. The mixture was then exposed to cold temperatures, approximately −40° C. and re-frozen.

Freeze Drying

The frozen mixture was then freeze dried using traditional coffee freeze drying technology.

Figure 2:
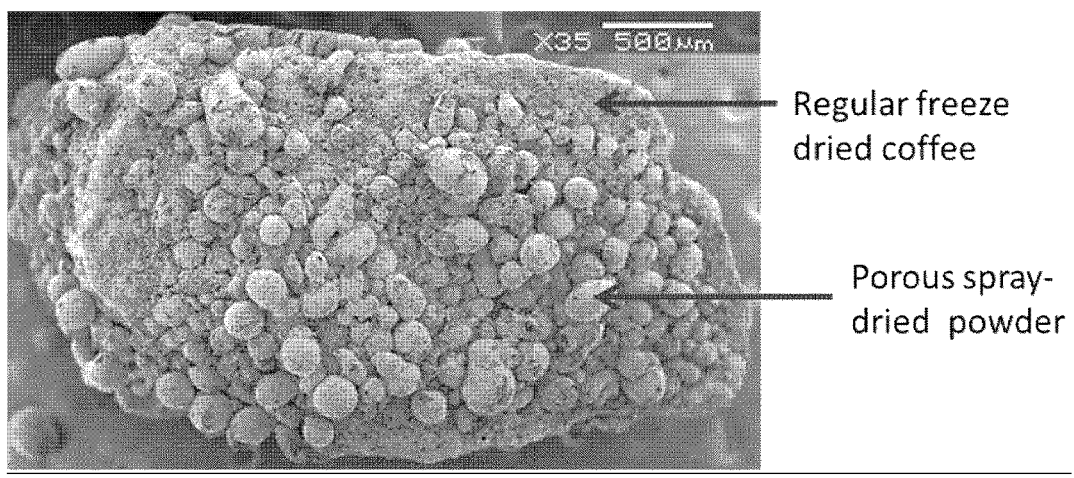
FIG. 2 is a scanning electron microscopy image of a soluble coffee powder of the invention.

The freeze dried product exhibited a similar particle size distribution and product density as the standard freeze dried coffee products. The color of the resulting product was approximately 36 for the L-value based on the L-A-B color measurement. The resulting texture appearance is shown in FIG. 1, and FIG. 2 shows a picture from Scanning Electron Microscopy of the particles, showing the porous spray dried soluble coffee powder stuck to the surface of the freeze-dried granule.

Foaming Properties

Crema (foam) volume was measured by a Foam Measuring Device (FMD) as disclosed in WO 2009/040249 by dissolving 5 grams of soluble coffee powder in 200 mL of hot water at 90° C. The soluble coffee powder produced a volume of foam of 3 mL upon dissolution.

The invention claimed is:

1. A method of producing a soluble coffee powder, the method comprising:

a) providing a porous spray dried soluble coffee powder having a particle size between about 10 and about 300 microns;
b) providing a granulated frozen coffee extract by injecting gas into a liquid coffee extract, freezing the gas-injected liquid coffee extract, and granulating the frozen gas-injected coffee extract, wherein the frozen granulated coffee extract has a particle size between about 500 and about 3600 microns;
c) heating the granulated frozen coffee extract to partly melt the powder surface;
d) mixing the porous spray dried coffee powder with the heated granulated frozen coffee extract to produce particles of the frozen coffee extract covered by particles of the porous spray dried coffee powder, wherein the particles of the porous spray dried coffee powder adhere to and coat the particles of the granulated frozen coffee extract; and
e) freeze drying the covered particles of frozen coffee extract obtained in step d) to obtain the soluble coffee powder,
wherein the soluble coffee powder produces a foam volume of at least about 1 mL when 5 g of the soluble coffee powder is dissolved in 200 mL water at 90° C.

2. The method of claim 1, wherein the porous spray dried soluble coffee powder is provided by injecting gas into a liquid coffee extract and spray drying the gas injected liquid coffee extract.

3. The method of claim 1, wherein a weight ratio of the porous spray dried powder and the granulated frozen coffee extract is between about 66:33 and about 20:80 during the mixing of step d).

4. The method of claim 1, wherein the frozen granulated coffee extract provided in step b) has a water content between about 25 and about 75% by weight.

5. The method of claim 1, wherein the porous spray dried soluble coffee powder provided in step a) has a porosity of at least about 55%.

6. The method of claim 1, wherein pores of the porous spray dried soluble coffee powder provided in step a) have an average diameter $D_{50}$ of less than about 80 microns.

7. The method of claim 1, wherein pores of the porous spray dried soluble coffee powder provided in step a) have a distribution span factor of less than about 4.

8. A method of producing a soluble coffee powder, the method comprising:
a) providing a porous spray dried soluble coffee powder having a particle size between about 10 and about 300 microns;
b) providing a granulated frozen coffee extract by injecting gas into a liquid coffee extract, freezing the gas-injected liquid coffee extract, and granulating the frozen gas-injected coffee extract, wherein the frozen granulated coffee extract has a particle size between about 500 and about 3600 microns;
c) mixing the porous spray dried coffee powder with the granulated frozen coffee extract to produce particles of the frozen coffee extract covered by particles of the porous spray dried coffee powder;
d) heating the granulated frozen coffee extract after and/or during the mixing in step c) to partly melt the powder surface, wherein the particles of the porous spray dried coffee powder adhere to and coat the particles of the granulated frozen coffee extract; and
e) freeze drying the covered particles of frozen coffee extract obtained in step d), wherein the soluble coffee powder produces a foam volume of at least about 1 mL when 5 g of the soluble coffee powder is dissolved in 200 mL water at 90° C.

9. The method of claim 1, wherein the method does not include sintering.

10. The method of claim 8, wherein the method does not include sintering.

* * * * *